(12) United States Patent
Abou Rjeily (10) Patent No.: US 7,974,361 B2
(45) Date of Patent: Jul. 5, 2011

(54) INCOHERENT TYPE MIMO UWB COMMUNICATION SYSTEM

(75) Inventor: Chadi Abou Rjeily, Byhior (LB)

(73) Assignee: Commissariat a l'Energie Atomique, Paris (FR)

( * ) Notice: Subject to any disclaimer, the term of this patent is extended or adjusted under 35 U.S.C. 154(b) by 551 days.

(21) Appl. No.: 12/152,708

(22) Filed: May 15, 2008

(65) Prior Publication Data
US 2009/0103589 A1    Apr. 23, 2009

(30) Foreign Application Priority Data
May 21, 2007   (FR) ...................... 07 55164

(51) Int. Cl.
H04B 7/02    (2006.01)
H04L 1/02    (2006.01)

(52) U.S. Cl. ........ 375/267; 375/299; 375/260; 375/347; 375/239; 455/500; 455/101

(58) Field of Classification Search .............. 375/260, 375/267, 299, 347, 239; 455/500, 101
See application file for complete search history.

(56) References Cited

U.S. PATENT DOCUMENTS
7,340,009 B2 *   3/2008   Giannakis et al. ............ 375/299
7,693,229 B2 *   4/2010   Feher ............................. 375/279

OTHER PUBLICATIONS

Abou-Rjeily et al., "A 2×2 Antennas Ultra-Wideband System with Biorthogonal Pulse Position Modulation," IEEE Communications Letters 10(5):366-8 (2006).
Abou-Rjeily et al., "A Rate-1 2×2 Space-Time Code Without Any Constellation Extension for TH-UWB Communication Systems with PPM," IEEE CEA-LETI, rue des Martyrs, Grenoble, France pp. 1683-1687 (2007).
Abou-Rjeily et al., "Amplify-and-Forward Cooperative Diversity with Space-Time Coded UWB Systems," IEEE CEA-LETI, rue des Martyrs, Genoble, France pp. 429-434 (2006).
Abou-Rjeily et al., "Space-Time Coding for Multiuser Ultra-Wideband Communications," IEEE Transactions on Communications 54(11):1960-72 (2006).
European Search Report for European Patent Application No. EP08156301 (Sep. 29, 2008).
Yang et al., "Analog Space-Time Coding for Multiantenna Ultra-Wideband Trnasmissions," IEEE Transactions on Communications 52(3):507-17 (2004).

* cited by examiner

*Primary Examiner* — Phuong Phu
(74) *Attorney, Agent, or Firm* — Nixon Peabody LLP (57) ABSTRACT

This invention relates to a space-time coding process for a pulse type MIMO-UWB system using symbols belonging to a PPM modulation alphabet. Orthogonality of signals emitted by the different antennas is achieved by providing a mechanism for permutation of PPM symbol modulation positions and by imposing a constraint on the positions of said symbols. The space-time coding process according to the invention enables an incoherent type reception.

10 Claims, 5 Drawing Sheets

INCOHERENT TYPE MIMO UWB COMMUNICATION SYSTEM

CROSS REFERENCE TO RELATED APPLICATIONS OR PRIORITY CLAIM

This application claims priority to French Patent Application No. 07 55164, filed May 21, 2007.

DESCRIPTION

1. Technical Field

This invention relates to the fields of Ultra Wide Band (UWB) and Multiple Input Multiple Output (MIMO) telecommunication systems.

2. State of Prior Art

A great deal of research has been carried out on UWB telecommunication systems during recent years. These systems are special in that they work directly in base band on so-called ultra wide band signals. A UWB signal is usually a signal conforming with the spectral mask stipulated in the Feb. 14, 2002 FCC regulations, revised in March 2005, in other words, essentially a signal in the 3.1 to 10.6 GHz spectral band with a band width of at least 500 MHz at −10 dB.

UWB signals can be divided into two categories: multi-band OFDM (MB-OFDM) signals and UWB pulse type signals. A UWB pulse signal is composed of very short pulses of the order of a few hundred picoseconds to one nanosecond. The remainder of the description will be limited to pulse UWB systems.

Furthermore, multi-antenna type systems are well known in the state of the art. These system use a plurality of emission and/or reception antennas and are named MIMO (Multiple Input Multiple Output), MISO (Multiple Input Single Output) or SIMO (Single Input Multiple Output), depending on the configuration type adopted. In the following, we will use the same term MIMO to cover the above mentioned MIMO and MISO variants. The use of spatial diversity in emission and/or reception enables these systems to offer significantly better channel capacities than conventional single antenna systems (or SISO for Single Input Single Output). This spatial diversity is usually completed by a time diversity by means of space-time coding (STC). In this type of coding, an information symbol to be transmitted is coded on several antennas and several transmission instants.

A distinction can be made between:
- systems with coherent reception in which the receiver knows the characteristics of the transmission channel, typically by a channel estimate made from pilot symbols transmitted by the emitting terminal. The channel estimate is then used to detect information symbols. Coherent systems are usually intended for high speed applications;
- incoherent reception systems in which the receiver detects information symbols blind, i.e. without prior knowledge of characteristics of the transmission channel.

MIMO systems with space-time coding using UWB pulse transmission signals have been proposed in the literature both for coherent and for incoherent reception. In particular, the article by L. Yang et al. entitled <<Analog space-time coding for multi-antenna ultra-wideband transmissions>> published in IEEE Trans. on Comm., Vol. 52, No. 3, March 2004, pages 507-517 describes a MIMO UWB system with incoherent reception using a PPM (Pulse Position Modulation) modulation to code transmission symbols on each antenna. In the recommended system, the signal emitted by an antenna $p \in \{1, \ldots, P\}$ for a given user terminal with P antennas to transmit a symbol s belonging to a PPM modulation alphabet can be written during a symbol time $T_s$:

$$s_p(t) = \sum_{n=0}^{N_f - 1} a_{pn} w(t - nT_f - c_n T_c - s\varepsilon) \quad (1)$$

where w(t) is the shape of the elementary pulse, $T_s = NT_f$ is the symbol time composed of N frames with a duration $T_f$, $\{c_0, c_1, \ldots, c_{N_f-1}\}$ is an access sequence specific to the user defining the time hops $c_n T_c$ where $T_c$ is the duration of the elementary chip, s is a PPM position belonging to $\{0, \ldots, M-1\}$, $\varepsilon \ll T_C$ is the time difference separating two consecutive PPM positions, $\{\alpha_{p,0}, \alpha_{p,1}, \ldots, \alpha_{p,N_f-1}\}$, $p=1, \ldots, P$ are modulation sequences, for example BPSK modulation sequences which enable to make signals emitted by the different antennas orthogonal. The signal given by the expression (1) is said to be of the TH-UWB (Time Hopped UWB) type because the different users are separated by orthogonal sequences of time hops.

Figure 1A:
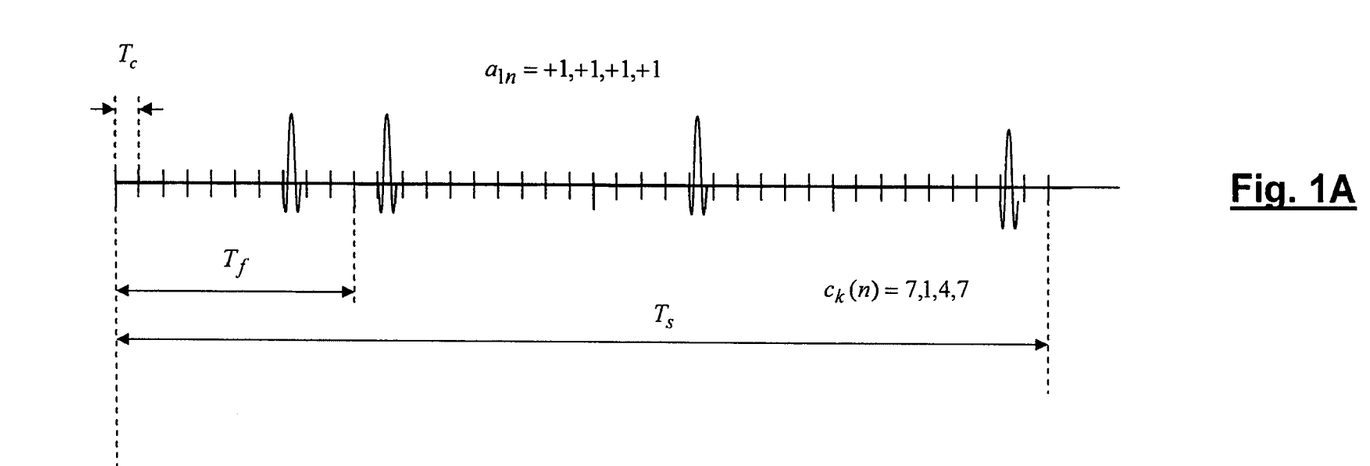
FIGS. 1A and 1B show signals transmitted by two antennas in a known MIMO-UWB system according to the state of the art.
Figure 1B:
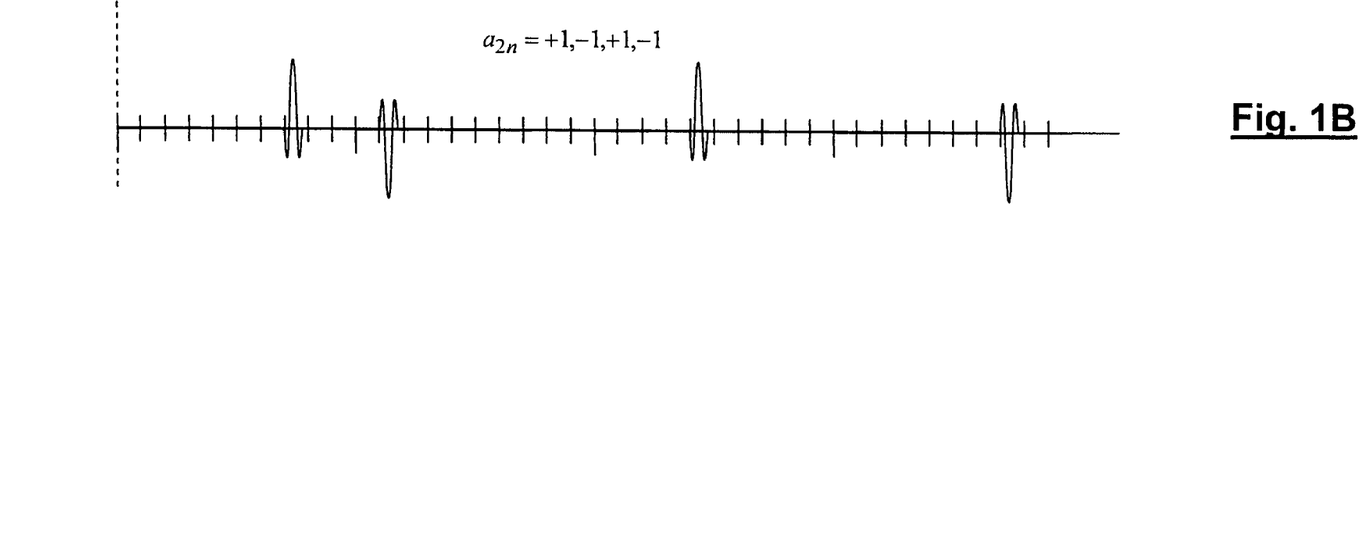

FIGS. 1A and 1B illustrate transmission signals emitted by the two antennas of a user terminal for the same PPM symbol. The user sequence in this case is $c_n=7,1,4,7$ and the PPM position s=0. Note that the corresponding BPSK weighing sequences of these two antennas expressed in vector form $a_1=(+1,+1,+1,+1)$ and $a_2=(+1,-1,+1,-1)$, are actually orthogonal to each other on emission, in other words $a_1 a_2^T = 0$.

The system described above is capable of achieving maximum diversity without any need for channel estimate. Therefore it is theoretically suitable for incoherent reception.

However, the use of BPSK modulation sequences to separate signals from the different antennas of a particular user terminal requires the ability to retrieve polarity information at the receiver. Considering the very short duration of the pulses used, it is extremely difficult to retrieve phase information in a UWB signal.

Furthermore, the BPSK modulation used in emission results in an inversion of the polarity of specific pulses, as can be seen in FIGS. 1A and 1B. In fact, this is equivalent to using a composite alphabet in which each symbol is defined by a pulse position and a sign causing increasing complexity of the modulator, rather than a classical PPM modulation alphabet.

Consequently, the purpose of this invention is to propose a MIMO-UWB system with simple and robust space-time coding with incoherent reception, enabling separation of the different antenna signals without needing to retrieve phase information on reception.

PRESENTATION OF THE INVENTION

This invention is defined by a space-time coding process for a pulse UWB telecommunication system with a plurality P of radiation elements. This process associates any combination $s_1, s_2, \ldots, s_P$ of P symbols belonging to a PPM modulation alphabet with M modulation positions, where M>P+1, the space-time code defined by the matrix:

$$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix}$$

with a possible permutation of its rows and/or columns, the symbols in each column of said matrix being intended to be emitted by a given radiation element and the symbols of each row of said matrix being intended to be emitted during a given channel use, where Ω is a permutation of the modulation positions and the $s_1, s_2, \ldots, s_P$ Symbols satisfy the following constraint:

$$s_i \neq s_j \text{ for } i,j=1, \ldots, P \text{ with } i \neq j$$

$$\Omega s_i \neq s_j \text{ for } i=2, \ldots, P \text{ and } j=1, \ldots, i-1.$$

The corresponding modulation positions $s_1, s_2, \ldots, s_P$ of symbols $s_1, s_2, \ldots, s_P$ advantageously satisfy the constraint $0 < s_1 < s_2 < \ldots < s_P < M$, and Ω is then a circular permutation of the modulation positions transforming each modulation position $s \in \{0, \ldots, M-1\}$ into position $\omega(s) = s+1[M]$.

Each element in the space-time code matrix can be used to modulate the corresponding positions of the pulses of a TH-UWB signal.

The invention also relates to an emission terminal with a plurality P of radiation elements designed to emit pulse type UWB signals. This terminal comprises a transcoder to code a first plurality l of information symbols $\sigma_1, \sigma_2, \ldots, \sigma_l$ into a second plurality P of symbols $s_1, s_2, \ldots, s_P$ belonging to a PPM modulation alphabet, a space-time encoder generating the space-time code defined by the following matrix from these symbols:

$$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix}$$

with a possible permutation of its rows and/or columns, the symbols in each column (p) of said matrix being intended to be emitted by a given radiation element and the symbols in each row of said matrix being intended to be emitted during a given channel use, where Ω is a permutation of the modulation positions and the $s_1, s_2, \ldots, s_P$ symbols satisfy the constraint:

$$s_i \neq s_j \text{ for } i, j=1, \ldots, P \text{ with } i \neq j$$

$$\Omega s_i \neq s_j \text{ for } i=2, \ldots, P \text{ and } j=1, \ldots, i-1.$$

The corresponding modulation positions $s_1, s_2, \ldots, s_P$ of the symbols $s_1, s_2, \ldots, s_P$ provided by the transcoder advantageously satisfy the constraint $0 < s_1 < s_2, \ldots, s_P < M$, and Ω is then a circular permutation of modulation positions transforming each modulation position $s \in \{0, \ldots, M-1\}$ into position $\omega(s) = s+1[M]$. The terminal may comprise a plurality of TH-UWB signal modulators, each modulator modulating a TH-UWB signal by successive elements of a column of said matrix. For example, each modulator modulates the position of each pulse of said TH-UWB signal.

Said radiation elements may be UWB antennas, light emitting diodes or laser diodes.

Finally, the invention also relates to a reception terminal comprising one or several (Q) reception antennas, in which the signal received by each antenna is filtered by a bank of filters matched to a plurality KP of TH-UWB signals defined as follows, with a possible multiplication by a multiplication factor:

$$s_p^{v-1}(t) = \frac{1}{\sqrt{N_f}} \sum_{n=0}^{N_f-1} \sum_{m=0}^{M-1} w(t - nT_f - \delta(m - c_p^{v-1})\varepsilon)$$

for a plurality P of uses $v=0, \ldots, P-1$ of the channel, where $c_p^{v-1} \in \{0, \ldots, M-1\}$ is defined as the modulation position of the PPM symbol in the v-th row and p-th column of the matrix $$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix}$$

with constraint $0 < s_1 < s_2 < \ldots < s_P < M$ where $s_1, s_2, \ldots, s_P$ are the corresponding positions of the $s_1, s_2, \ldots, s_P$ symbols;

the energies of signals output from said adapted filters are integrated by integrators for said P uses of the channel and each combination of symbols $s_1, s_2, \ldots, s_P$ satisfying said constraint;

for each said combination, the energies thus integrated for the different antennas are summated in summators;

the integrated energies summated for each of said combinations are compared in a comparator (450) that selects the combination with the maximum value.

BRIEF DESCRIPTION OF THE DRAWINGS

Other characteristics and advantages of the invention will become clear after reading the preferred embodiment of the invention with reference to the appended figures in which.

DETAILED PRESENTATION OF PARTICULAR EMBODIMENTS

The idea on which the invention is based is to use a space-time code in a pulse type MIMO-UWB system for which the elements belong to a sub-set of a PPM modulation alphabet and to achieve orthogonality between emitted signals by employing a modulation position permutation mechanism.

We will once again consider a MIMO UWB pulse system and more particularly a user terminal with P emission antennas.

In the following, we will conventionally represent a space-time code in matrix form:

$$C = \begin{pmatrix} c_1^0 & c_2^0 & \cdots & c_P^0 \\ c_1^1 & c_2^1 & \cdots & c_P^1 \\ \vdots & \vdots & \ddots & \vdots \\ c_1^{P-1} & c_2^{P-1} & \cdots & c_P^{P-1} \end{pmatrix} \quad (2)$$

in which the elements $c_p^n$, p=1, ..., P, n=0, ..., P−1 are transmission symbols modulating the signals of the different antennas. More precisely, each column in the matrix corresponds to an antenna and each row in the matrix corresponds to an instant at which the channel is used (Per Channel Use or PCU). Thus, the $c_p^n$ symbol will be emitted by the antenna p during the (n+1)th PCU.

According to one general embodiment, the proposed space-time code is defined by the following matrix:

$$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix} \quad (3)$$

in which the elements $s_1, s_2, \ldots, s_P$ are the symbols of a PPM modulation alphabet with cardinal M, satisfying a constraint given later, and $\Omega$ is a permutation of modulation positions. A permutation of modulation positions refers to any bijection of the set of modulation positions on itself, other than identity.

The above mentioned constraint affecting the symbols $s_1, s_2, \ldots, s_P$ is expressed as follows:

$s_i \neq s_j$ for i,j=1, ..., P with i≠j $\Omega s_i \neq s_j$ for i=2, ..., P and j=1, ..., i−1  (4)

It is essential to understand that, if the symbols $s_1, s_2, \ldots, s_P$ satisfy the constraint (4), then the symbols in each row of the matrix C defined in (3) are distinct. In other words, for each use of the channel, the corresponding modulation positions of the symbols transmitted by the different antennas are distinct, which results in the orthogonality of the emitted signals and maximum diversity of the space-time code.

It will be noted that this property is maintained if the rows and/or columns of the matrix C are permuted. Permutation of two rows is equivalent to permuting two transmission instants and permutation of two columns is equivalent to permuting two antennas. Obviously, these two operations maintain the orthogonality property of the emitted signals.

In the following, we will refer indifferently to a PPM symbol either by giving its modulation position $s_p \in \{0, \ldots, M-1\}$ or by means of its vector representation, $s_p = (s_p^0, s_p^1, \ldots, s_p^{M-1})^T$ where $s_p^m = \delta(m - s_p)$ and $\delta(.)$ is the Dirac distribution. It will be understood that all components of this vector are equal to zero except for one equal to 1, indicating the modulation position of the symbol in question.

According to one advantageous embodiment, the permutation $\Omega$ is a circular permutation.

In using this vector representation, $\Omega$ may be written as matrix with size M×M:

$$\Omega = \begin{pmatrix} 0_{1 \times M-1} & 1 \\ I_{M-1 \times M-1} & 0_{M-1 \times 1} \end{pmatrix} = \begin{pmatrix} 0 & 0 & \cdots & 0 & 1 \\ 1 & 0 & \cdots & 0 & 0 \\ 0 & 1 & 0 & \ddots & \vdots \\ & & \cdots & \ddots & 0 \\ 0 & 0 & \cdots & 1 & 0 \end{pmatrix} \quad (5)$$

where $I_{M-1 \times M-1}$ is the identity matrix with size M−1×M−1, $0_{1 \times M-1}$ is the null row vector with size M−1, $0_{M-1 \times 1}$ is the null column vector with size M−1.

The matrix C of the space-time code may also be written as a matrix with size PM×M, composed solely of "0" and "1" values, by developing the PPM symbols:

$$C = \begin{bmatrix} s_1^0 & s_2^0 & \cdots & s_P^0 \\ s_1^1 & s_2^1 & \cdots & s_P^1 \\ \vdots & \vdots & \cdots & \vdots \\ s_1^{M-1} & s_2^{M-1} & \cdots & s_P^{M-1} \\ s_P^{M-1} & s_1^0 & \ddots & \vdots \\ s_P^0 & s_1^1 & \ddots & \vdots \\ \vdots & \vdots & \ddots & \vdots \\ s_P^{M-2} & s_1^{M-1} & \ddots & \vdots \\ \vdots & \vdots & \ddots & s_2^0 \\ \vdots & \vdots & \ddots & s_2^1 \\ \vdots & \vdots & \ddots & \vdots \\ \vdots & \vdots & \ddots & s_2^{M-1} \\ s_2^{M-1} & \cdots & s_P^{M-1} & s_1^0 \\ s_2^0 & \cdots & s_P^0 & s_1^1 \\ \vdots & \cdots & \vdots & \vdots \\ s_2^{M-2} & \cdots & s_P^{M-2} & s_1^{M-1} \end{bmatrix} \quad (6)$$

According to this advantageous embodiment of the invention, the constraint (4) is made by imposing the following condition:

$0 < s_1 < s_2 < \ldots < s_P < M$  (7)

In this case, the corresponding modulation positions of the different symbols form an ordered increasing sequence, the first modulation position being prohibited. It will be noted that the condition (7) assumes that P distinct values belonging to the set $\{1, 2, \ldots, M-1\}$ can be chosen. Consequently, we must have:

$P \leq M-1$  (8)

Figure 2:
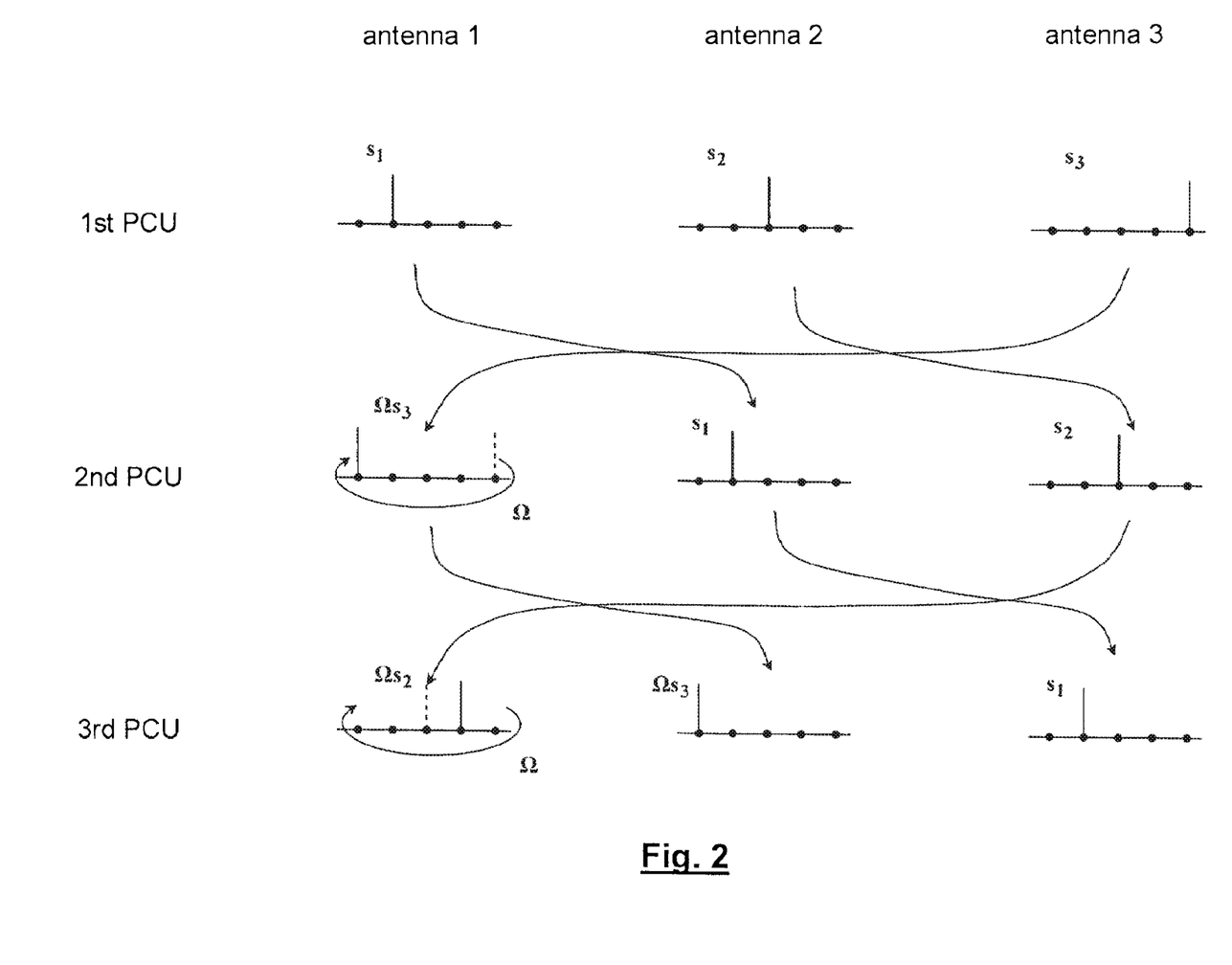
FIG. 2 shows an example of a space-time code according to the invention.

FIG. 2 shows an example of the space-time code according to one embodiment of the invention where P=3 and M=5. For each PPM symbol, the modulation position is represented by a vertical line for the three antennas and for the three consecutive uses of the channel.

It can be seen that the fact of reserving the first modulation position prevents a collision between the modulation positions of $\Omega s_P$ and $s_1$ during the second use of the channel. Similarly, the fact that the positions $s_1, s_2, \ldots, s_P$ are in order as indicated in (7) ensures that the modulation positions of the PPM symbols for use of any channel remain distinct and that, as mentioned above, the signals emitted by the different antennas are clearly orthogonal.

Furthermore, it will be noted that the number of PPM symbols satisfying condition (7) is equal to the number K of combinations of P elements among M−1, namely $$K = \binom{P}{M-1}.$$

Therefore, the number of symbols transmitted by use of the channel can be expressed as the average of the P successive uses:

$$R = \frac{K}{P} = \frac{M-1}{P} \cdot \frac{M-2}{P} \cdot \frac{M-3}{P-1} \cdots \frac{M-P}{2} \quad (9)$$

expression greater than 1 since it is the product of terms greater than 1. This number increases with increasing difference between M and P, which is logical in that there is then greater latitude in the choice of PPM symbols.

Figure 3:
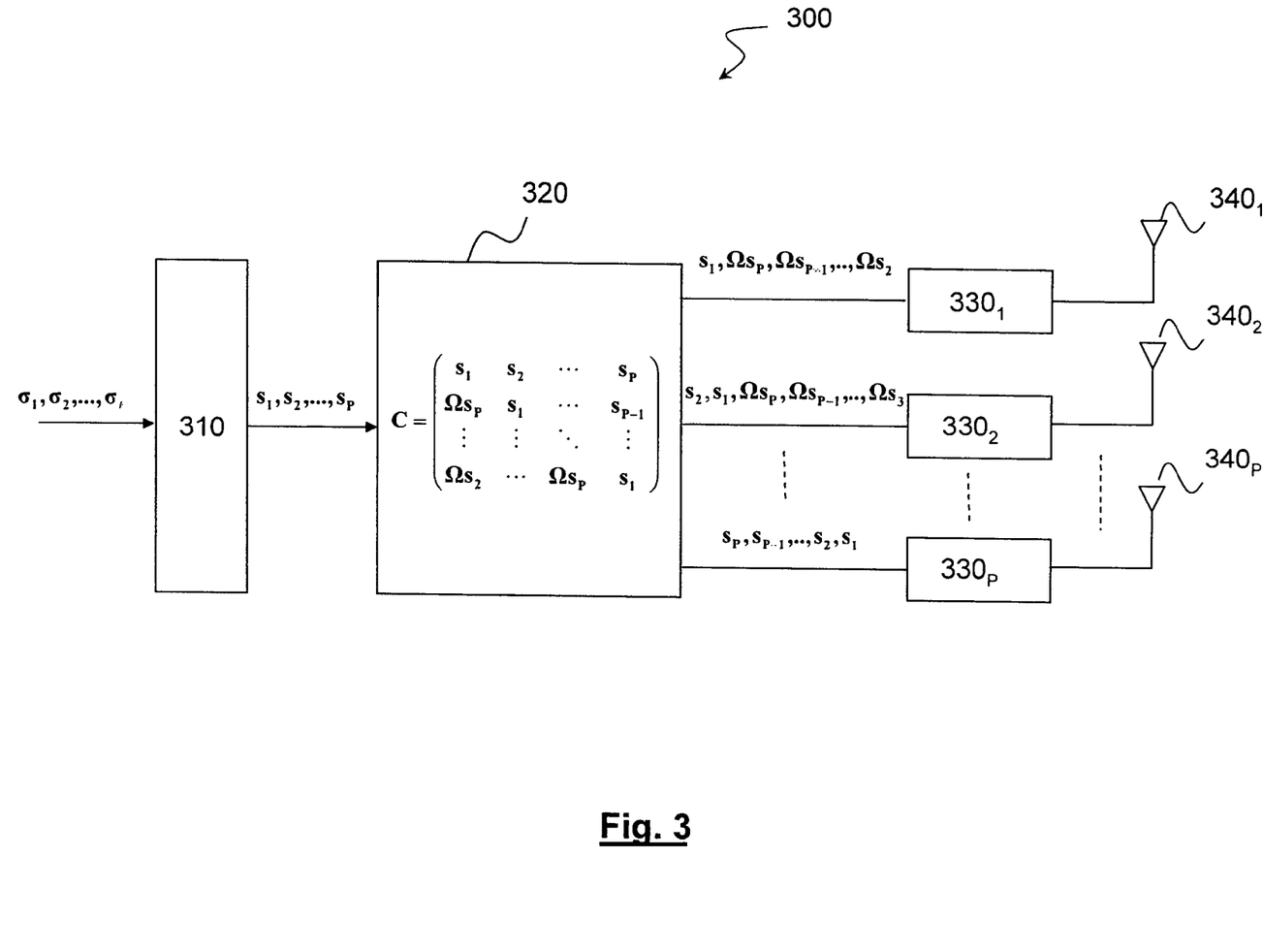
FIG. 3 shows an emitter of a MIMO system using a space-time coding according to one embodiment of the invention.

FIG. 3 diagrammatically shows an emitter of a MIMO-UWB system using a space-time code according to one embodiment of the invention.

The emitter 300 receives information symbol frames denoted $\sigma_1, \sigma_2, \ldots, \sigma_I$, where $1 \leq \log_2(K)$ if these symbols are binary and more generally $1 \leq \log_2(K)/\log_2(\mu)$ if they are µ-ary. Information symbols will be transcoded in module 310 to supply PPM transmission symbols $s_1, s_2, \ldots, s_P$. The transcoding function may be arbitrary provided that it is biunivocal.

The PPM symbols $s_1, s_2, \ldots s_P$ are space-time coded in module 320. This module transmits the sequences of PPM symbols corresponding to P rows of the matrix C, to the UWB modulators $330_1, 330_2, \ldots, 330_P$ respectively, namely the sequence $s_1, \Omega s_P, \Omega s_{P-1}, \ldots, \Omega s_2$ to modulator $330_1$, $s_2, s_1, \Omega s_P, \Omega s_{P-1}, \ldots, \Omega s_3$ to modulator $330_2, \ldots$, sequence $s_P, s_{P-1}, \ldots, s_2, s_1$ to modulator $330_P$.

According to one embodiment, the modulators $330_1, \ldots, 330_P$ are of the TH-UWB type. In this case, for example, the signal generated by $330_1$ has the same shape as in (1), using the same notation conventions:

for first use of the channel (PCU):

$$s_1(t) = \sum_{n=0}^{N_f-1} w(t - nT_f - c_n T_c - s_1 \varepsilon) \quad (10)$$

for second use of the channel:

$$s_1(t) = \sum_{n=0}^{N_f-1} w(t - nT_f - c_n T_c - \omega(s_P)\varepsilon) \quad (11)$$

with $\omega(s_P) = s_P + 1[M]$ where [.] denotes the modulo operation. and so on until the P th use of the channel:

$$s_1(t) = \sum_{n=0}^{N_f-1} w(t - nT_f - c_n T_c - \omega(s_2)\varepsilon) \quad (12)$$

The signals originating from other modulators are obtained mutatis mutandis starting from the other columns in matrix C. The signals in the different modulators are then transmitted through the radiation elements $340_1, \ldots, 340_P$, for example UWB antennas, of the light emitting diodes or laser diodes.

Figure 4:
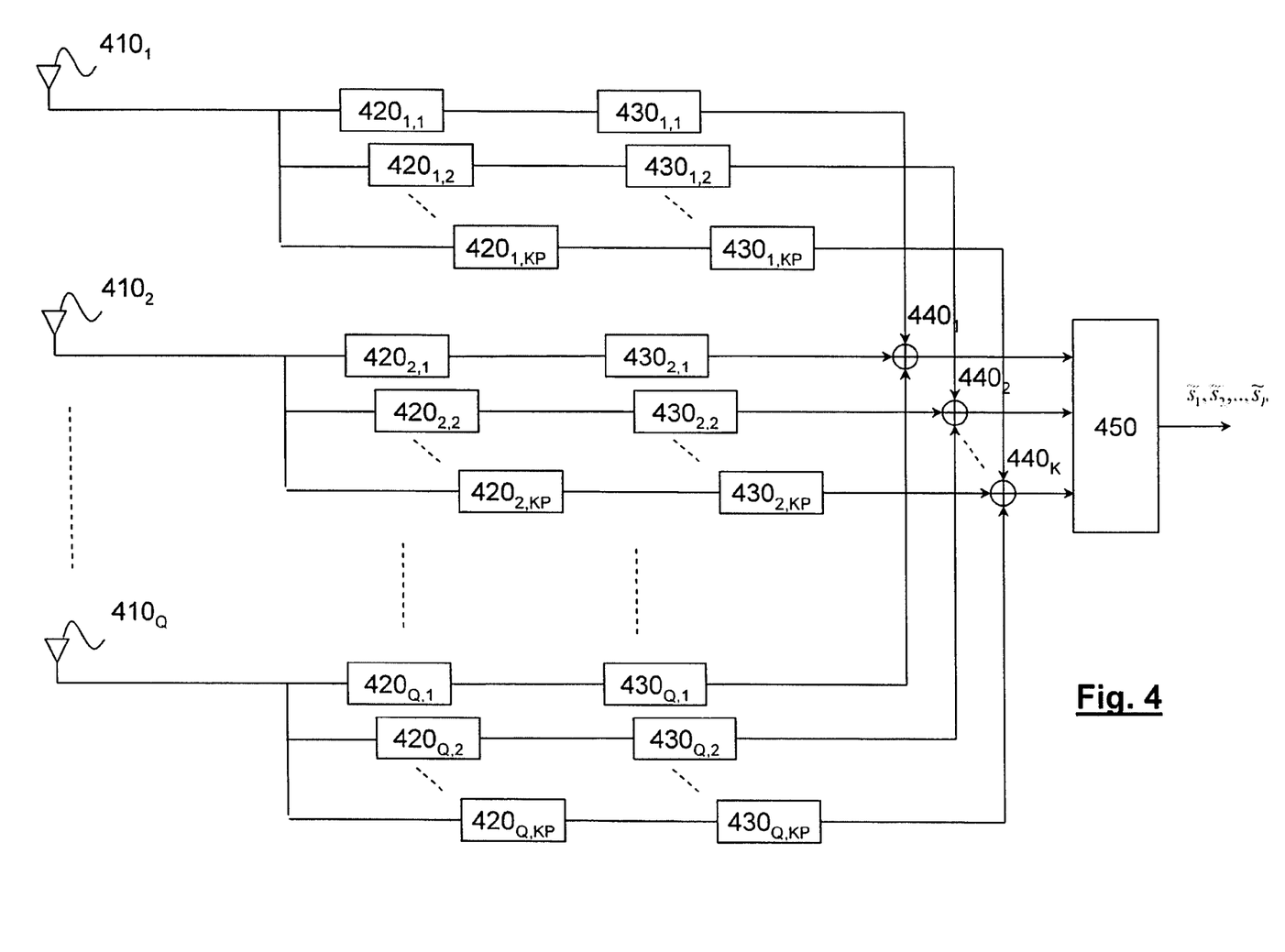
FIG. 4 shows a receiver of a MIMO system used to decode a space-time code according to one embodiment of the invention.

The signals thus transmitted may be decoded by a space-time decoding device according to one embodiment of the invention, as shown in FIG. 4. The device comprises a plurality Q of reception antennas or photodetectors depending on the nature of the signals emitted.

The signal received by the antenna $410_q$, corresponding to the v-th use of the channel may be written in the form:

$$r_q(t) = \sum_{p=1}^{P} \sum_{n=0}^{N_f-1} \sum_{m=0}^{M} h_{pq} \otimes w(t - nT_f - \delta(m - c_p^{v-1})\varepsilon) + n_q(t) \quad (13)$$

where $\otimes$ is the convolution sign, $c_p^{v-1}$ is the PPM position of the symbol $c_p^{v-1}$ of the matrix C, as defined in (2) and (3), $h_{pq}$ is the pulse response of the channel between the emission antenna p and the reception antenna q, and $n_q(t)$ is the reception noise at the antenna $410_q$.

The signal received by each antenna $410_q$, $q=1, \ldots, Q$ is filtered by a bank of KP filters $420_{q,1}$ to $420_{q,KP}$ matched to the corresponding signals:

$$s_p^{v-1}(t) = \frac{1}{\sqrt{N_f}} \sum_{n=0}^{N_f-1} \sum_{m=0}^{M-1} w(t - nT_f - \delta(m - c_p^{v-1})\varepsilon) \quad (14)$$

for each of the v uses of the channel, in which it should be remembered that $c_p^{v-1}$ is the PPM position of the symbol in the v-th row and the p-th column in the matrix C as defined in (3), with the constraint (7), in other words $0 < c_1^0 < c_2^0 < \ldots < c_P^0 < M$. The KP matched filters correspond to the signals emitted by the P antennas for the K possible combinations of $s_1, s_2, \ldots, s_P$ satisfying this constraint.

The outputs from the matched filters are then detected by quadratic detectors $430_{k,q}$ for $k=1, \ldots, K$ and $q=1, \ldots, Q$. Each quadratic detector integrates the energy of the received signal during the P successive uses of the channel.

The detected signals for a particular combination are summated in summators $440_k$, $k=1, \ldots, K$. Finally, the comparator 450 selects the highest summated value.

It can be demonstrated that the summated value corresponding to the symbols actually emitted $\tilde{s}_1, \tilde{s}_2, \ldots, \tilde{s}_P$ is equal to:

$$E(\tilde{s}_1, \tilde{s}_2, \ldots, \tilde{s}_P) = P \sum_{p=1}^{P} \sum_{q=1}^{Q} |h_{pq}|^2 \quad (15)$$

where $h_{pq}$ is the coefficient of transmission of the channel between the emission antenna p and the reception antenna q. The factor P in (16) is due to the fact that integration is done on P uses of the channel.

In the other hand, it can be shown that the general form of the summated value for the summated value related to an arbitrary combination of symbols $s_1, s_2, \ldots, s_P$ is:

$$E(s_1, s_2, \ldots, s_P) = \sum_{p=1}^{P} \alpha_p \sum_{q=1}^{Q} |h_{pq}|^2 \text{ where} \quad (16)$$

$$\alpha_p \in (1, \ldots, P)$$

the equality $\alpha_1=\alpha_2=\ldots=\alpha_P=P$ only being satisfied for $(s_1, s_2, \ldots, s_P)=(\tilde{s}_1, \tilde{s}_2, \ldots, \tilde{s}_P)$. Consequently, $E(\tilde{s}_1, \tilde{s}_2, \ldots, \tilde{s}_P)$ actually corresponds to the maximum summated value (16).

Figure 5:
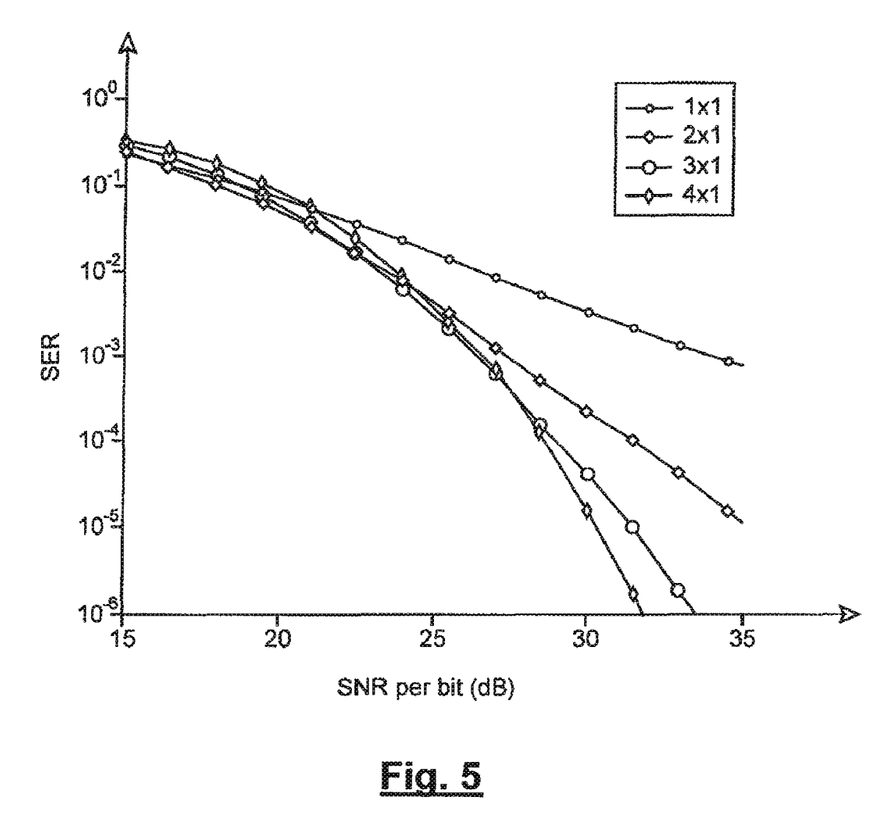
FIG. 5 shows the symbol error rate as a function of the signal—noise ratio for a single antenna system and for a multi-antenna system using the space-time coding according to the invention.

FIG. 5 compares the error rate per symbol as a function of the signal to noise ratio, for a single antenna system (1×1) and for MIMO-UWB systems using a space-time coding according to the invention. The antenna configurations used in the MIMO system are 2×1, 3×1 and 4×1. It can be seen that the single antenna system for low signal to noise ratios is slightly better than for MIMO systems. This is due to the fact that the space-time codes according to the invention have lower rates than a simple PPM code in a single antenna system. Remember that the speed of a space-time code (3) is $$\frac{\log_2\binom{P}{M-1}}{P}$$

per PCU while the speed for a PPM simple coding is $\log_2(M)$ per PCU. It will be noted that the deterioration observed at a low signal to noise ratio is less sensitive if the modulation degree M is high. On the other hand, for higher values of the signal to noise ratio, the space-time coding according to the invention is significantly better than for a classical single antenna, as can be seen in FIG. 5.

The invention claimed is:

1. Space-time coding process for a pulse UWB telecommunication system having a plurality P of radiation elements, characterised in that said process associates any combination $s_1, s_2, \ldots, s_P$ of P symbols belonging to a PPM modulation alphabet with M modulation positions, where M>P+1, for generating a space-time code defined by the matrix:

$$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix}$$

with a possible permutation of its rows and/or columns, the symbols in each column of said matrix being intended to be emitted by a given radiation element and the symbols of each row of said matrix being intended to be emitted during use of a given channel, where $\Omega$ is a permutation of the modulation positions and the $s_1, s_2, \ldots, s_P$ symbols satisfy the following constraint:

$s_i \neq s_j$ for $i, j=1, \ldots, P$ with $i \neq j$ $\Omega s_i \neq s_j$ for $i=2, \ldots, P$ and $j=1, \ldots, i-1$.

2. Space-time coding process according to claim 1, characterised in that the corresponding modulation positions $s_1, s_2, \ldots, s_P$ of symbols $s_1, s_2, \ldots, s_P$ satisfy the constraint $0 \leq s_1 < s_2 < \ldots < s_P < M$, and that $\Omega$ is a circular permutation of the modulation positions transforming each modulation position $s \in \{0, \ldots, M-1\}$ into position $\omega(s)=s+1[M]$.

3. Space-time coding process according to claim 1, characterised in that each element in the space-time code matrix modulates the corresponding positions of the pulses of a TH-UWB signal.

4. Emission terminal (300) having a plurality P of radiation elements designed to emit pulse type UWB signals, characterised in that it comprises a transcoder (310) for coding a first plurality 1 of information symbols $\sigma_1, \sigma_2, \ldots, \sigma_l$ into a second plurality P of symbols $s_1, s_2, \ldots, s_P$ belonging to a PPM modulation alphabet, a space-time encoder (320) generating the space-time code defined by the following matrix from these symbols:

$$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix}$$

with a possible permutation of its rows and/or columns, the symbols in each column (p) of said matrix being intended to be emitted by a given radiation element ($340_p$) and the symbols in each row of said matrix being intended to be emitted during use of a given channel, where $\Omega$ is a permutation of the modulation positions and the $s_1, s_2, \ldots, s_P$ symbols satisfy the constraint:

$s_i \neq s_j$ for $i, j=1, \ldots, P$ with $i \neq j$ $\Omega s_i \neq s_j$ for $i=2, \ldots, P$ and $j=1, \ldots, i-1$.

5. Emission terminal according to claim 4, characterised in that the corresponding modulation positions $s_1, s_2, \ldots, s_P$ of symbols $s_1, s_2, \ldots, s_P$ provided by the transcoder satisfy the constraint $0 \leq s_1 < s_2 < \ldots < s_P < M$, and that $\Omega$ is a circular permutation of modulations positions transforming each modulation position $s \in \{0, \ldots, M-1\}$ into position $\omega(s)=s+1[M]$.

6. Emission terminal according to claim 4, characterised in that it comprises a plurality of TH-UWB signal modulators ($330_1, 330_2, \ldots, 330_P$), each modulator modulating a TH-UWB signal by successive elements of a column of said matrix.

7. Emission terminal according to claim 6, characterised in that said modulator modulates the position of each pulse of said TH-UWB signal.

8. Emission terminal according to claim 4, characterised in that said radiation elements are UWB antennas.

9. Emission terminal according to claim 4, characterised in that said radiation elements are light emitting diodes or laser diodes.

10. Reception terminal comprising one or several (Q) reception antennas in which the signal received by each antenna ($410_q$) is filtered by a bank of filters ($420_{q,1}, \ldots 420_{q,KP}$) matched to a plurality KP of TH-UWB signals defined as follows, with a possible multiplication by a multiplication factor:

$$s_p^{v-1}(t) = \frac{1}{\sqrt{N_f}} \sum_{n=0}^{N_f-1} \sum_{m=0}^{M-1} w(t - nT_f - \delta(m - c_p^{v-1})\varepsilon)$$

for a plurality P of uses $v=0, \ldots, P-1$ of the channel, where $c_p^{v-1} \in \{0, \ldots, M-1\}$ is defined as the modulation position of the PPM symbol in the v-th row and p-th column of the matrix $$C = \begin{pmatrix} s_1 & s_2 & \cdots & s_P \\ \Omega s_P & s_1 & \cdots & s_{P-1} \\ \vdots & \vdots & \ddots & \vdots \\ \Omega s_2 & \cdots & \Omega s_P & s_1 \end{pmatrix}$$

with the constraint $0 \leq s_1 < s_2 < \ldots < s_P < M$ where $s_1, s_2, \ldots, s_P$ are the corresponding positions of the $s_1, s_2, \ldots, s_P$ symbols;

the energies of signals output from said matched filters are integrated into integrators ($430_{1,1}, \ldots, 430_{1,PK}$) for said P uses of the channel and each combination of symbols $s_1, s_2, \ldots, s_P$ satisfying said constraint;

for each said combination, the energies thus integrated for the different antennas are summated in summators ($440_1, \ldots, 440_K$);

the integrated energies thus summated for each of said combinations are compared in a comparator (450) that selects the combination having the maximum value.

\* \* \* \* \*